United States Patent [19]

Manning et al.

[11] 4,375,839

[45] Mar. 8, 1983

[54] MEASURING DEVICE FOR WEIGHING VEHICLE CARGO

[75] Inventors: John J. Manning, San Jose, Calif.; Ralph M. Richart, Valley Cottage, N.Y.; Robert E. Rosin, San Jose, Calif.

[73] Assignee: RMR Systems Inc., San Jose, Calif.

[21] Appl. No.: 260,824

[22] Filed: May 5, 1981

[51] Int. Cl.³ ............................................ G01G 19/18
[52] U.S. Cl. ...................................... 177/137; 73/296; 177/207; 340/666
[58] Field of Search ............... 177/136, 137, 138, 207, 177/210 R; 340/620, 666; 73/309, 304 R, 296

[56] References Cited

U.S. PATENT DOCUMENTS

| 2,412,363 | 12/1946 | Silverman | 73/304 X |
| 2,996,697 | 8/1961 | Ellis | 177/137 X |
| 3,216,517 | 11/1965 | John | 177/207 |
| 4,106,579 | 8/1978 | Hayes | 177/137 |

Primary Examiner—Joseph W. Hartary
Attorney, Agent, or Firm—Hopgood, Calimafde, Kalil, Blaustein & Judlowe

[57] ABSTRACT

An apparatus for accurately and conveniently weighing the load carried in a vehicle provides a readout of the weight of the cargo by sensing the relative vertical movement of the load-carrying portion of the vehicle, which is proportional to the weight of the load, and by converting the sensed relative vertical motion to a readout of the weight of the load.

3 Claims, 5 Drawing Figures

MEASURING DEVICE FOR WEIGHING VEHICLE CARGO

The present invention relates generally to an apparatus for measuring weight, and more particularly to an apparatus for measuring the weight of cargo carried in a vehicle such as a truck.

It is often necessary to determine the weight of cargo that is carried in a vehicle. The common procedure utilized to measure this weight is to drive the vehicle onto a weighing scale, which provides a readout of the combined weight of the vehicle itself along with the weight of the cargo that is carried by the vehicle.

There are, however, clear and significant drawbacks to this procedure. First, access to a weighing station is required, which is not always available when needed. Second, the weight that is measured on these scales is the overall or combined weight of the vehicle and the cargo which it carries, and thus does not provide the desired weight of the cargo alone.

It is, therefore, an object of the present invention to provide a weighing apparatus which provides an accurate indication of the weight of cargo carried by a vehicle, which apparatus is available for use in providing an indication of the cargo weight wherever the vehicle is located.

It is a further object of the invention to provide a weight measuring apparatus of the type described, which provides an accurate indication of cargo weight with a minimum of mechanical moving components.

Our previously filed application, Ser. No. 06/188,929 described a device for measuring the level of a fluid by using the conductivity of the fluid to create an electrical conduction path between a reference conductor and one of several other conductors. The particular conduction path effected in this matter is converted through logic circuitry to provide a visual indication of the height of the fluid.

The present invention arises out of the realization that the concept of the invention disclosed in said earlier-filed application can be adopted for use in an improved apparatus for measuring the weight of cargo carried in a vehicle.

In the present invention, a first member carrying a plurality of vertically spaced sensors and a reference sensor is mounted to either a fixed part of the vehicle or to another part of the vehicle which is displaced vertically by an amount proportional to the weight of the cargo carried by the vehicle. This first member is vertically movable with respect to a second member, which, in turn, is secured to the other of the movable or fixed part of the vehicle by an amount that is thus proportional to the weight of the cargo.

The second member contains a quantity of a conductive liquid which, when the vehicle carries no cargo, is above the reference sensor carried by the first member. As the cargo is loaded onto the vehicle, its weight causes the first member to be displaced vertically to a greater depth into the liquid, such that the liquid rises above one or more of the other spaced sensors carried by the first member.

The reference sensor and the other spaced sensors are connected to logic circuitry, which produces a readout calibrated in terms of weight, which is a function of the uppermost one of the sensors that is beneath the surface of the liquid.

In another aspect of the invention, the first and second members are incorporated into a platform weighing station, which provides an indication of the weight of a vehicle or other heavy object that is placed on the weighing platform.

To the accomplishment of the above and to such further objects as may hereinafter appear, the present invention relates to a vehicle cargo weighing apparatus substantially as defined in the appended claims and as described in the following detailed specification as considered together with the accompanying drawings in which:

Figure 1:
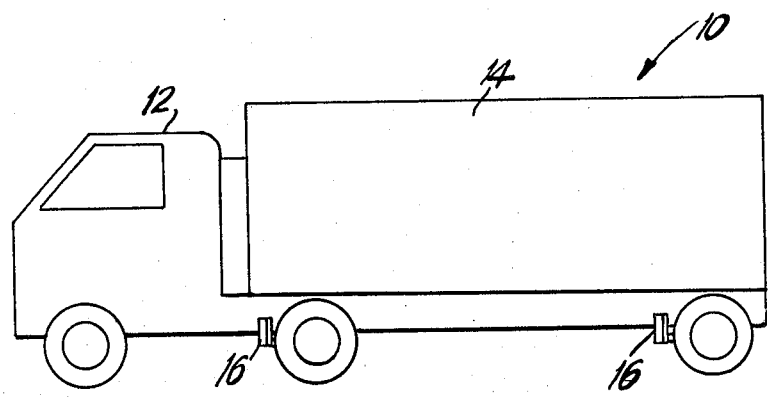
FIG. 1 is an elevation of a truck illustrating the arrangement of the cargo weighing device of the invention.

Referring to FIG. 1, there is shown a vehicle 10 having a cabin 12 and cargo-carrying van 14. The vehicle has attached thereto, in a manner shown in greater detail in FIG. 2, the cargo-weighing apparatus of the invention, generally designated 16, one of which is mounted on each of the four corners of the van 14, only two of which can be seen in FIG. 1.

Figure 2:
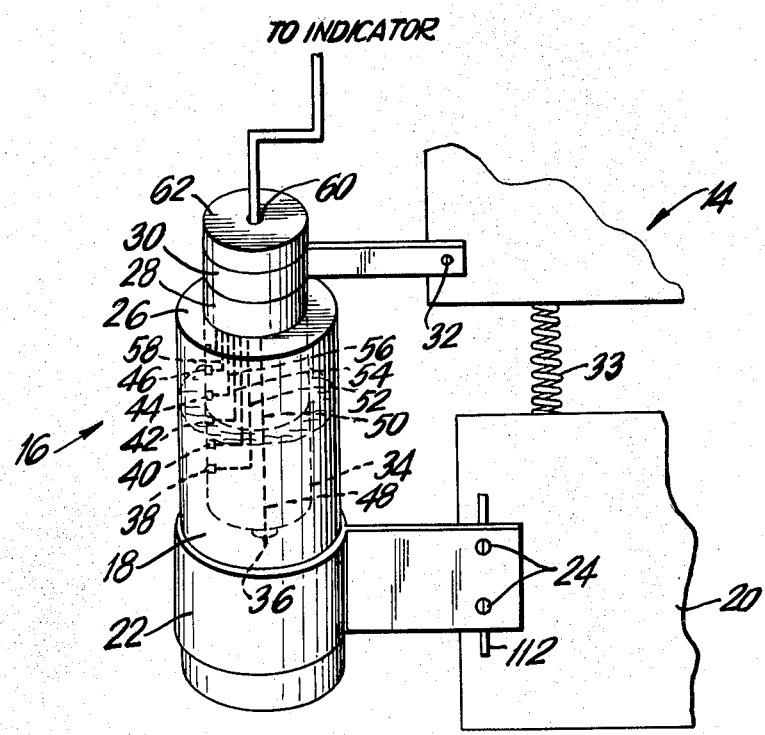
FIG. 2 is a schematic diagram of a vehicle cargo weighing apparatus in accordance with an embodiment of the invention.

Referring now to FIG. 2, the cargo weighing apparatus comprises a first cylindrical member 18, which is secured to a fixed portion of the vehicle 10, here shown as an axle 20 of the vehicle, by means of a clamp 22 secured to axle 20 by means of screws 24.

Member 18 is closed at its bottom and at its top is provided with a cover 26 which has a central circular opening thereon, through which passes the lower part of a second cylindrical member 28. Member 28 is secured by a clamp 30 by means of a screw 32 to a part of the vehicle, here the corner of the van 14, which moves vertically in proportion to the weight of the load or cargo carried by van 14 to compress a spring 33, which is connected at its opposite ends of the axle 20 and the van 14.

Member 18 carries within it a quantity of an electrically conductive liquid 34, such as water, which may, as shown, fill slightly more than half of the interior space of member 18. The lower part of member 28, which carries at its bottom surface a reference sensor 36, extends partly into the liquid 34. Member 28 also carries on its outer wall a plurality, here shown for purposes of example as being five, of vertically spaced electrical conductors or sensors 38–46. The number of the sensors 38–46, which extend below the surface of the liquid 34, is determined by the relative vertical position of the van to which movable member 28 is attached. That, in turn, will be determined by the weight carried by van 14; that is, the greater the weight carried by the van, the lower the van will move closer to the axle, and, in turn, the greater number of sensors 38–46 will move downward into the liquid 34.

As shall be explained below, a readout of the weight of the cargo carried by the van is provided in accordance with the number of sensors that are caused to be positioned below the surface of the liquid 34 (sensors 36-42 in FIG. 2) as a result of the proportional downward movement of the van. For a no-load condition, only reference sensor 36, which is connected to a reference potential such as ground, is below the surface of the liquid, whereas all of the other sensors are above the liquid surface. When the increased weight of the van caused by the placement of cargo in the van is sufficient to move member 28 downward so that one or more of sensors 38-46 is below the surface of the liquid, those sensors below the liquid surface are electrically connected via the liquid 34 to reference sensor 36 and thus to the reference potential or ground.

Figure 3:
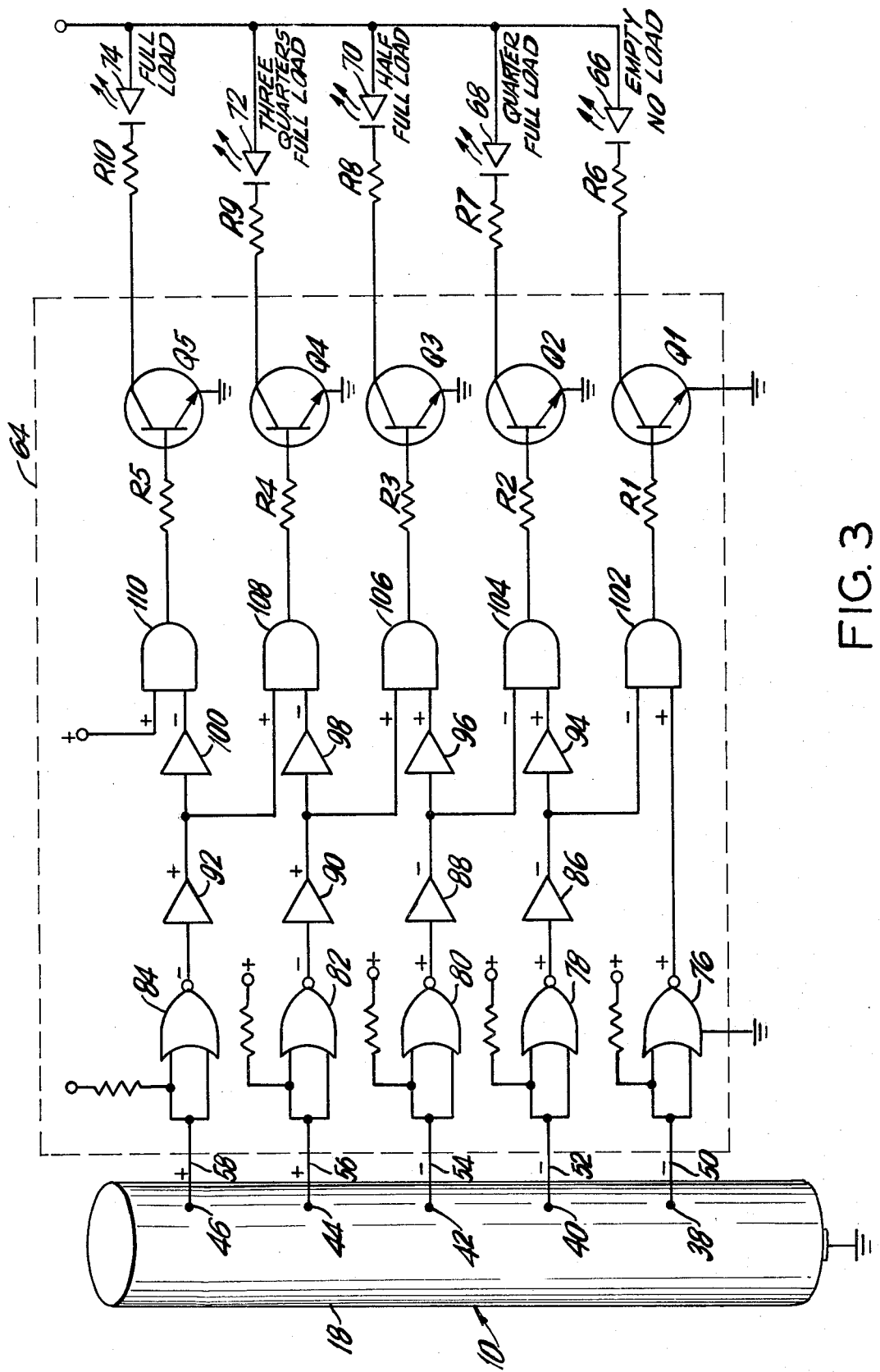
FIG. 3 is a schematic diagram of logic circuitry that can be employed in the weighing apparatus of the invention.

Sensors 36-46 are connected respectively to wires 48-58, which pass through an opening 60 formed in a top cover 62 of member 28. The wires 48-58 are all connected to logic circuitry 64 shown schematically in FIG. 3, to selectively actuate one of a number of indicators, here shown as a plurality of light-emitting diodes (LEDs) to provide a visual indication of the cargo weight.

The LED indicators can also be calibrated to provide a readout in terms of unit of weight, such as tons, rather than as fractions of full load. Moreover, if a more accurate indication of the cargo weight is desired, a greater number of sensors, vertically spaced from one another by a smaller distance than when only five sensors are used, as in FIG. 2, may be arranged along member 28, with a corresponding modification being made to logic circuitry 64 to accomodate and process the inputs from these additional sensors.

The logic circuit 64 operates in response to which of the sensors 38-46 are below the surface of the liquid 34 to provide a signal that selectively activates one of the LEDs depending on which, if any, of the sensors is below the surface of the liquid. More specifically, sensors 38-46 are respectively connected to the inputs of CMOS NOR gates 76-84. One of the inputs to each of the NOR gates is also connected to a source of a positive voltage. The outputs of NOR gates 78-84 are respectively connected to the inputs of a plurality of CMOS inverters 86-92. The outputs of the inverters are, in turn, connected respectively to the inputs of inverters 94-100 and to one input of CMOS AND gates 102-110. The output of NOR gate 76 is applied directly to an input of AND gate 102, and the outputs of inverters 94-100 are respectively applied to the second inputs of AND gates 104-110. A second input of AND gate 110 is connected to a positive voltage source.

The outputs of AND gates 102-110 are respectively connected through resistors R1, R2, R3, R4, and R5 to the bases of NPN drive transistors Q1, Q2, Q3, Q4, and Q5. The emitter of each of the transistors is connected directly to ground, and the collectors of the transistors Q1-Q5 are connected respectively through resistors R6, R7, R8, R9, and R10 to the cathodes of LEDs 66-74. The anodes of the LEDs are all connected in common and to a positive voltage source.

Member 28 may be positioned with respect to member 18 such that, as shown in FIG. 2, when there is no load carried by van 14, only sensors 36 and 38 are below the surface of the liquid 34 in member 18, and all other sensors are above the liquid surface. When member 28 moves vertically downward in response to the loading of cargo in van 14 such that, as shown in FIG. 2, sensors 40 and 42 are also below the liquid, those sensors are connected through the liquid to one another and to reference sensor 36, and thus to ground. The other sensors above the level of the liquid, namely sensors 44 and 46, are not electrically connected by the liquid and thus remain at a potential above ground level.

Thus, a low or ground signal is applied from sensors 38, 40 and 42 to the inputs of only NOR gates 76, 78, and 80, respectively, each of which produces a high signal at its output. The high output of gate 76 is applied to one input of gate 102, and the high output of gate 78 is inverted by inverter 86 and again inverted by inverter 94, the output of which is applied to an input of AND gate 104. Similarly, the high output of gate 80 is inverted in inverters 96 and 106, and the twice-inverted output is applied to an input of AND gate 106.

Thus, under the condition corresponding to the weight or loading condition shown in FIG. 2, AND gate 106 receives two high inputs, whereas the other AND gates each receive a high and a low signal at their respective inputs. As a result, a high signal is applied to the base of only transistor Q3, which is rendered conductive, thereby to connect the cathode of LED 70 to ground, and actuate this LED. The other LEDs remain isolated from ground and thus remain in their unactuated condition. Accordingly, only a single LED indication, which corresponds to the uppermost sensor which is below the surface of the liquid, will be activated to indicate, as in the condition in FIG. 3, that the van is carrying between one-half load and less than three-quarter load.

The weight-measuring device of FIG. 2 can be periodically calibrated by placing a load of a known weight in the van of the vehicle and observing the weight indication obtained. If the indicator does not correlate accurately with the weight of the cargo, such as when there has been a change in the spring constant of spring 33, the weight-measuring device of the invention can be calibrated by changing the relative position of the member 28 and sensors 38-46 with respect to the water level in member 18 to establish a new no-load orientation for members 18 and 28.

To this end, member 18 can either be raised or lowered by loosening screws 24 and moving clamp 20 upwards or downwards in a vertical slot 112 formed in axle 20. Alternatively, member 28 may be moved vertically by loosening clamp 22 and manually moving member 28 to establish a calibrated no-load condition for the device.

Figure 4:
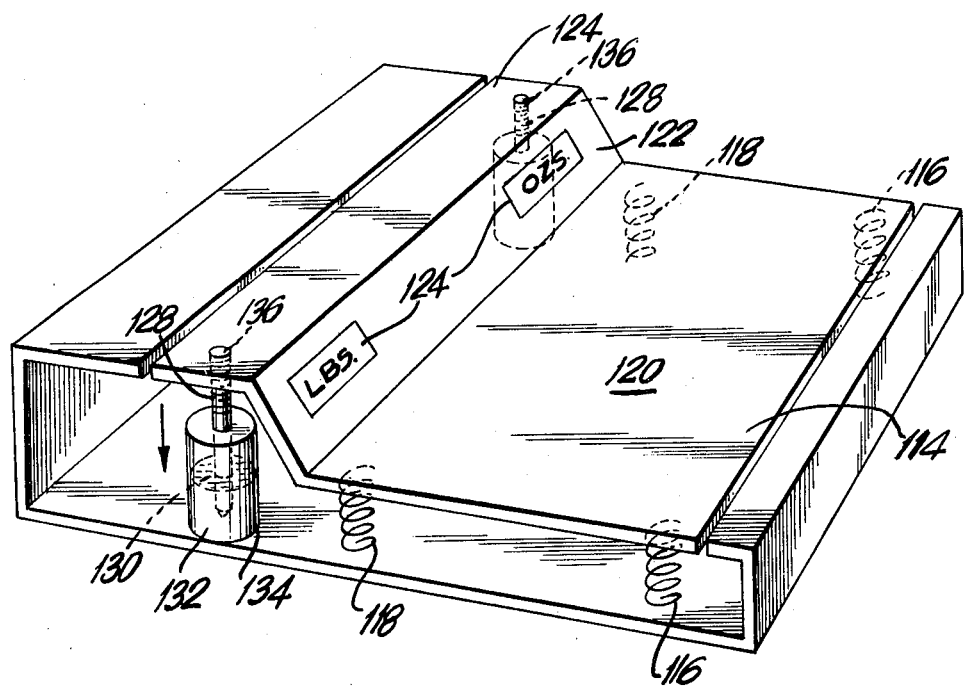
FIG. 4 is a schematic elevation of a platform scale embodying the features of the invention.

An alternative embodiment of the invention is illustrated in FIG. 4, which allows a vehicle, either loaded or unloaded, to be weighed. This apparatus includes a stepped platform 114 supported on two pairs of springs 116 and 118 disposed at the ends of the planar weighing area 120 of the platform. A tapering intermediate wall 122, which includes a weight display 124, connects the weighing area 120 to an upper-level portion 126.

Portion 126 has secured thereto the upper ends of a pair of movable members 128 of a weighing device similar to that shown in the first embodiment. That is, members 128 each carry a plurality of vertically spaced sensors 130, the lowermost one of which extends into a quantity of water 132 contained in a fixed container of member 134.

It will be appreciated that when a vehicle is placed onto weighing area 120, the platform 114 will be urged downwardly against the resistance force of springs 116, 118 by an amount proportional to the weight of the vehicle, and the spring constants of springs 116, 118.

That vertical displacement of the platform is also reflected by the extent of the vertical movement of the sensor-carrying member 126 into the water 132 to make the electrical connection between the lower and upper sensors which are beneath the water level, as described above with respect to the first embodiment. The particular electrical connection between the sensors thus made can be processed by a logic circuit similar to that shown in FIG. 3 to provide a weight readout which can be displayed on weight display 124. To calibrate the weight measuring apparatus of FIG. 4 so as to correct for changes in the spring constants of springs 116, 118, the vertical position of member 128 with respect to the fluid 132 for a no-load condition can be periodically calibrated by means of a position adjust calibrating sensor 136.

Figure 5:
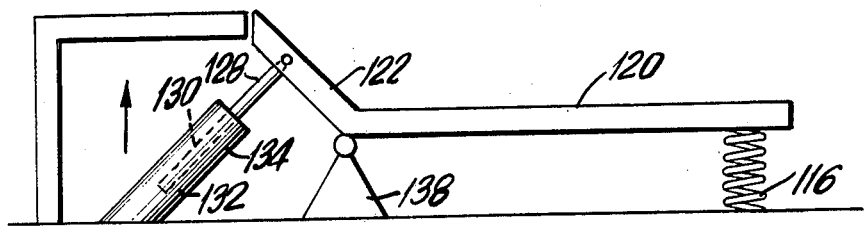
FIG. 5 is a schematic diagram of a variation of the platform scale of FIG. 4.

A variation of the vehicle-weighing apparatus of FIG. 4 is shown in FIG. 5, in which the weighing platform is pivoted at a fulcrum 138, and the member 128 is connected at its upper end to the sloping wall portion 122 and moves with the fixed member at an angle rather than vertically by an amount proportional to the weight of the load placed on the platform. The movement of the member 128 with respect to the height of the fluid 132 is converted in the manner previously described to provide an indication of the weight of the vehicle placed on the scale.

It will be apparent from the foregoing description of the invention that a device has been described that is capable of providing an accurate indication of the weight of cargo carried in a vehicle in a reliable and convenient manner. It will also be apparent that modifications to the embodiments of the invention described will be readily apparent to those skilled in the art without necessarily departing from the spirit and scope of the invention.

What is claimed is:

1. An apparatus for providing an indication of the weight of a load carried in a first part of a vehicle, said apparatus comprising a first member secured to said first part, a second member carried on a second part of said vehicle, said load-carrying part of the vehicle being movable relative to said second part by an amount proportional to the weight of the load carried thereby, said first member including a cylinder having an opening at its upper end and containing a quantity of an electrically conductive medium at a level below said upper end, said second member including a tubular member extending through said opening and carrying said plurality of sensors and said reference sensor on its outer periphery, said second member comprising a plurality of spaced and normally insulated sensors along the vertical axis thereof and a spaced reference sensor at the lower end thereof, at least said reference sensor being normally disposed below the surface of said conductive medium, and means connected to said plurality of sensors for providing a weight indication corresponding to which of said plurality of sensors is caused to be disposed below the surface of said conductive medium by the vertical movement of said load-carrying part of the vehicle.

2. The apparatus of claim 1, in which one of said first and second members is attached to the van of a truck, and the other of said first and second members is attached to the axle of the truck.

3. The apparatus of claim 1, further comprising means for adjusting the relative vertical position of said first member with respect to said second member.

* * * * *